US008000480B2

(12) United States Patent
Mollon

(10) Patent No.: US 8,000,480 B2
(45) Date of Patent: Aug. 16, 2011

(54) AUTOMOTIVE AUDIO SYSTEM ADAPTED FOR ROADWAY CONDITIONS

(76) Inventor: Eric L. Mollon, Livonia, MI (US)

( * ) Notice: Subject to any disclaimer, the term of this patent is extended or adjusted under 35 U.S.C. 154(b) by 0 days.

(21) Appl. No.: 12/566,817

(22) Filed: Sep. 25, 2009

(65) Prior Publication Data

US 2010/0014688 A1 Jan. 21, 2010

Related U.S. Application Data

(63) Continuation of application No. 10/463,731, filed on Jun. 17, 2003, now abandoned.

(51) Int. Cl.
*H04B 1/00* (2006.01)

(52) U.S. Cl. ......................... 381/86; 381/71.4; 381/71.2

(58) Field of Classification Search .................... 381/86, 381/302, 71.1–71.4, 104, 107, 57, 56, 98, 381/28, 102, 103; 181/201
See application file for complete search history.

(56) References Cited

U.S. PATENT DOCUMENTS 3,431,498 A 3/1969 Varterasian et al.
4,479,237 A 10/1984 Sugasawa
4,558,460 A 12/1985 Tanaka et al.
4,651,290 A 3/1987 Masaki et al.
4,933,987 A 6/1990 Park
5,208,866 A 5/1993 Kato et al.
5,245,664 A * 9/1993 Kinoshite et al. ............ 381/71.4
5,651,072 A 7/1997 Nakao et al.
5,802,486 A 9/1998 Uchiyama
5,872,852 A * 2/1999 Dougherty ...................... 381/57
6,031,918 A * 2/2000 Chahabadi ................... 381/94.1
7,254,240 B2 * 8/2007 Inoue et al. .................. 381/71.4
2003/0002686 A1 1/2003 Millott et al.

FOREIGN PATENT DOCUMENTS

EP 0246772 A1 11/1987

OTHER PUBLICATIONS

Office Action of Jun. 8, 2004, U.S. Appl. No. 10/463,731.
Amendment of Aug. 24, 2004, U.S. Appl. No. 10/463,731.
Office Action of Oct. 19, 2005, U.S. Appl. No. 10/463,731.
Amendment of Nov. 16, 2005, U.S. Appl. No. 10/463,731.
Office Action of Dec. 21, 2005, U.S. Appl. No. 10/463,731.
Interview Summary of Nov. 15, 2005, U.S. Appl. No. 10/463,731.
Office Action of Mar. 6, 2006, U.S. Appl. No. 10/463,731.
Amendment of Jun. 5, 2006, U.S. Appl. No. 10/463,731.
Office Action of Aug. 25, 2006, U.S. Appl. No. 10/463,731.
Appeal Brief of Jan. 11, 2007, U.S. Appl. No. 10/463,731.
Examiner's Answer of Jun. 18, 2007, U.S. Appl. No. 10/463,731.
Reply Brief of Jul. 10, 2007, U.S. Appl. No. 10/463,731.
Board or Appeals Decision of Jun. 5, 2009, U.S. Appl. No. 10/463,731.
Request for Rehearing of Aug. 4, 2009, U.S. Appl. No. 10/463,731.
Decision on Reconsideration of Aug. 18, 2009, U.S. Appl. No. 10/463,731.

* cited by examiner

*Primary Examiner* — Xu Mei
*Assistant Examiner* — Lun Lao

(57) ABSTRACT

A vehicle mounted audio multimedia system has a variable audio volume adapted to changes in the condition of a road surface. A vehicle occupant manually sets a desired audio volume level. Motion is sensed within a suspension system of the vehicle during travel of the vehicle. A roughness value is determined in response to the motion. The roughness value is transformed into a volume boost, the volume boost generally increasing with an increase in the roughness value. The volume boost is added to the desired audio volume level to provide the audio gain.

9 Claims, 3 Drawing Sheets

AUTOMOTIVE AUDIO SYSTEM ADAPTED FOR ROADWAY CONDITIONS

CROSS REFERENCE TO RELATED APPLICATIONS

This is a continuation of co-pending application Ser. No. 10/463,731, filed on Jun. 17, 2003.

STATEMENT REGARDING FEDERALLY SPONSORED RESEARCH

Not Applicable.

BACKGROUND OF THE INVENTION

The present invention relates in general to automotive audio systems, and, more specifically, to an audio system interacting with a vehicle suspension system for controlling audio reproduction level in response to rough road conditions.

In-vehicle entertainment systems reproduce audio programs from sources such as an AM/FM tuner, CD or cassette player, or a DVD or video tape player. A volume control is provided for manually adjusting amplifier gain so that the reproduced audio generated by loudspeakers has a desired sound pressure level. When a vehicle is moving, fluctuating levels of background sound are created which interfere with the ability of the vehicle occupants to hear the audio program. During times of significant background sound levels, it may become desirable to boost the volume of the audio playback to maintain consistent audibility of the audio program for the listeners.

Audio systems are known which measure an ambient noise level in the vehicle passenger cabin for the purpose of generating an audio boost proportional to the ambient noise. These systems, however, are relatively expensive. A microphone or other transducer to measure the ambient sound and a dedicated microphone signal input to the audio system are required, which results in increased component and manufacturing costs. Since the sound picked up by the microphone includes both the background sound and the audio program signal being reproduced by the audio system, the audio program signal must be subtracted from the microphone signal before the background sound level is determined. This results in complex signal processing and further increases the component costs.

Costs associated with the microphone have been avoided by controlling audio gain in response to an inference of the magnitude of interfering noise sources based on the vehicle's speed of movement. As vehicle speed increases, engine noise and wind noise typically increase. Thus, various schemes for increasing audio volume using vehicle speed as measured by a vehicle speedometer have been tried. These systems are not completely effective because the interfering noise level can vary greatly while traveling at the same speed. For example, a vehicle traveling on smooth pavement may be subject to less road induced noise than one traveling on a bumpy roadway. Wind noise depends not only on the vehicle speed, but also on the direction and speed of the ambient wind. Thus, there is no consistent relationship between vehicle speed and the magnitude of background noise.

SUMMARY OF THE INVENTION

The present invention has the advantage of providing a variable audio volume adapted to changes in the condition of a road surface. In vehicles having electronic suspension control systems, the present invention can be implemented without requiring additional components.

In one aspect of the invention, a method is provided for controlling an audio gain of an audio system in a motor vehicle. A vehicle occupant manually sets a desired audio volume level. Motion is sensed within a suspension system of the vehicle during travel of the vehicle. A roughness value is determined in response to the motion. The roughness value is transformed into a volume boost, the volume boost generally increasing with an increase in the roughness value. The volume boost is added to the desired audio volume level to provide the audio gain.

DETAILED DESCRIPTION OF PREFERRED EMBODIMENTS

Figure 1:
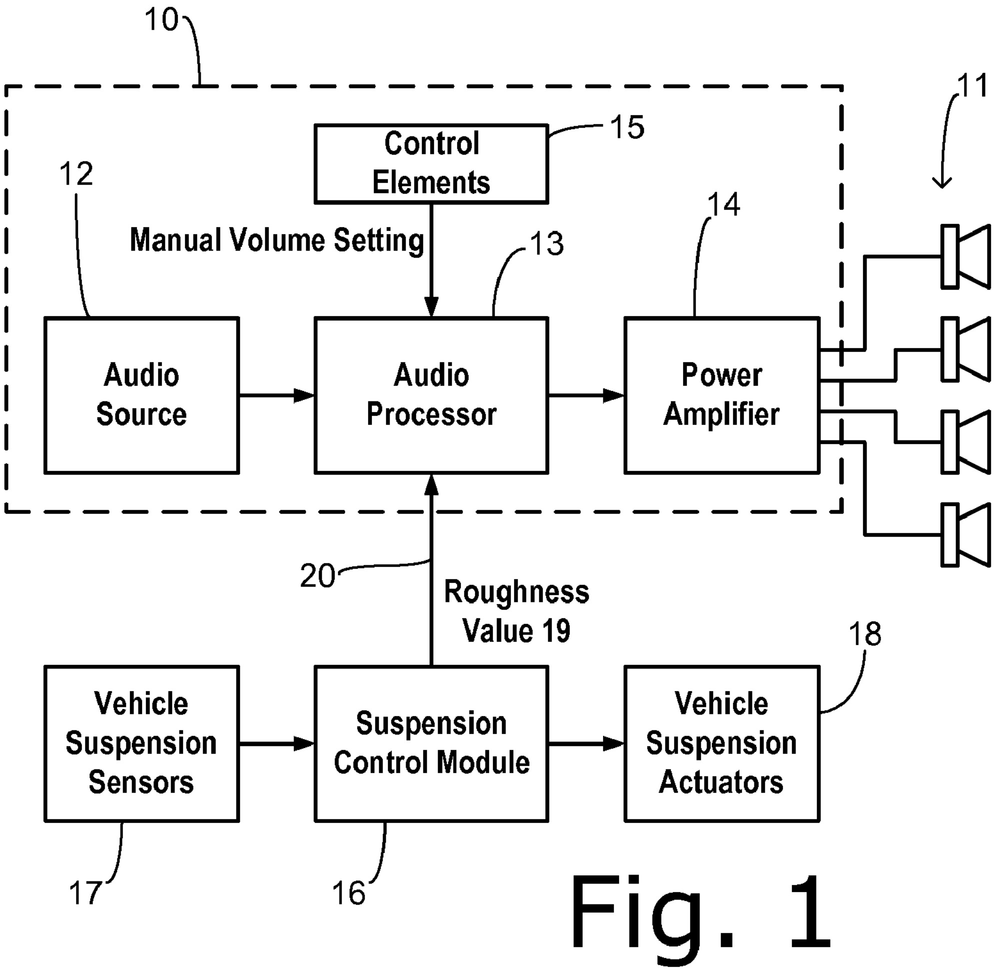
FIG. 1 is a block diagram showing a preferred embodiment for adapting volume of an audio multimedia system to the road roughness condition.

Referring to FIG. 1, an automotive multimedia audio system 10 drives a plurality of loudspeakers 11, such as pairs of left and right stereo speakers installed in the front and rear of the passenger cabin of a vehicle. An audio signal from an audio source 12 (e.g., a radio tuner, cassette tape player, CD player, or DVD player) is input to an audio processor 13. Either analog or digital audio processing can be employed using commercially available integrated circuit chipsets such as the SAA7705H car radio digital signal processor manufactured by Philips Semiconductors. A power amplifier 14 receives audio output signals from audio processor 13 and applies a fixed gain for driving speakers 11.

Audio processor 13 includes a pre-amplifier with a variable gain for each audio channel by virtue of volume, balance, and fade settings that are manually adjusted using control elements 15. Tone control is also provided using variable gains for separate audio frequency bands, such as treble and bass gains.

An electronic suspension control system includes a suspension control module 16 coupled to vehicle suspension sensor(s) 17 and to vehicle suspension actuator(s) 18. The suspension control system may comprise a conventional system such as an active damping system wherein sensors 17 include accelerometers mounted to the suspension components (e.g. for measuring vertical acceleration) and wherein actuators 18 include electrically-controlled shock absorbers. The suspension control system characterizes the roughness or unevenness of a road surface as part of an algorithm executed by suspension control module 16, thereby producing a roughness value 19 based on the motion of the vehicle suspension. Examples of the suspension control system are shown in U.S. Pat. No. 4,651,290, issued to Masaki et al, entitled "Road Condition Discriminating System," and U.S. Pat. No. 5,802,486, issued to Uchiyama, entitled "Suspension Control System Having A Shock Absorber Controlled To Predetermine Compression And Extension Damping Forces When Vehicle Is Running On A Bad Road."

The roughness value 19 is transmitted to audio processor 13 for the purpose of increasing audio gain when the vehicle is driving over rough surfaces and experiencing shaking that masks the audio program. Preferably, a multiplex communication bus 20 is coupled between audio system 10 and suspension control module 16. Bus 20 may comprise a conventional SAE J1850 multiplex bus as is widely deployed on current production vehicles.

Figure 2:
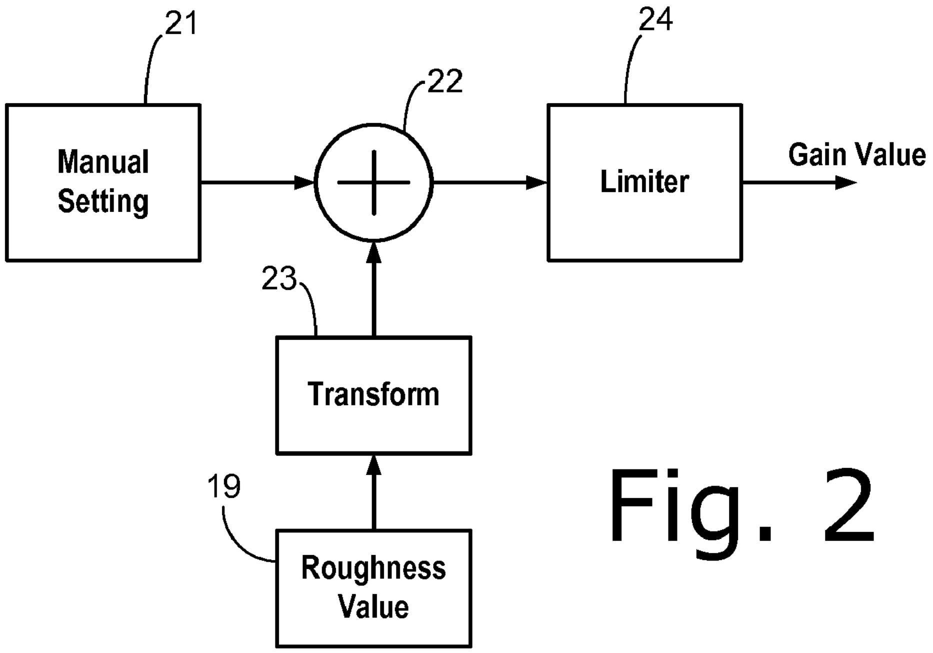
FIG. 2 is a block diagram of a determination of an audio gain value in response to a manual volume setting and a road roughness value.

A gain value for controlling the power amplifier is determined by the audio processor as shown in FIG. 2. A stored manual setting 21 that has been set by the user (or that has been set to a default value such as during powering on of the audio system) is coupled to one input of a summer 22. Roughness value 19 is input to a transform block 23 and the transformed value is coupled to another input of summer 22. Transform block 23 allows the actual volume boost generated at different values of road roughness to be adjusted according to the actual creation of noise for individual vehicle designs over a range of conditions. The sum from summer 22 is coupled to a limiter 24 which ensures that the gain value does not exceed a maximum allowable gain.

Figure 3:
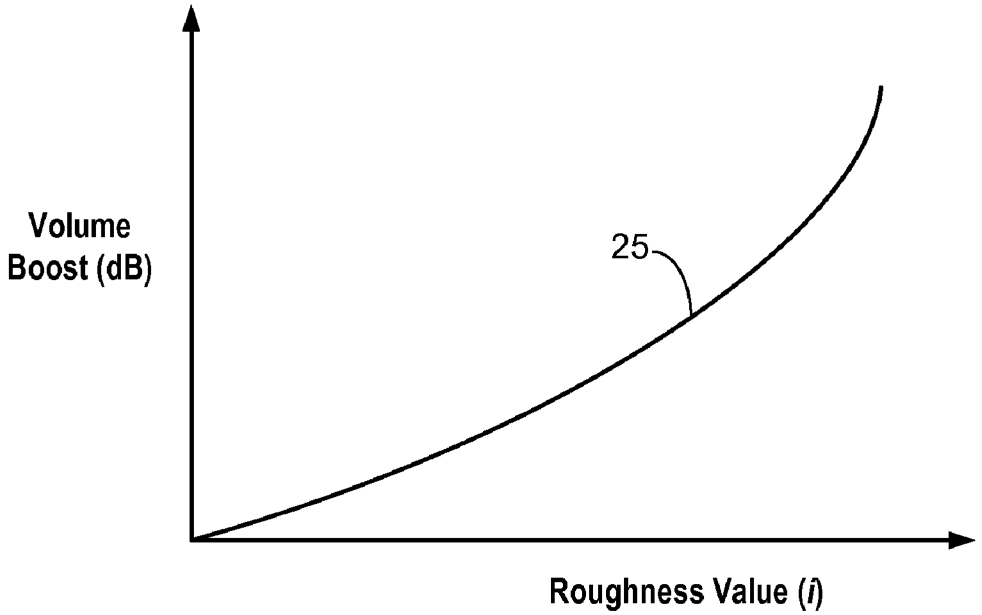
FIG. 3 shows a transfer function for determining a volume boost in response to the roughness value.

Transform block 23 may comprise a lookup table or may comprise an algebraic function relating each possible roughness value to a corresponding volume boost. FIG. 3 shows one example of a transfer function wherein the slope of a curve 25 increases at higher roughness values since the noise power of the road noise is generally not linearly related to actual roughness. Thus, an increased volume boost is typically necessary at the higher end of the roughness values.

Figure 4:
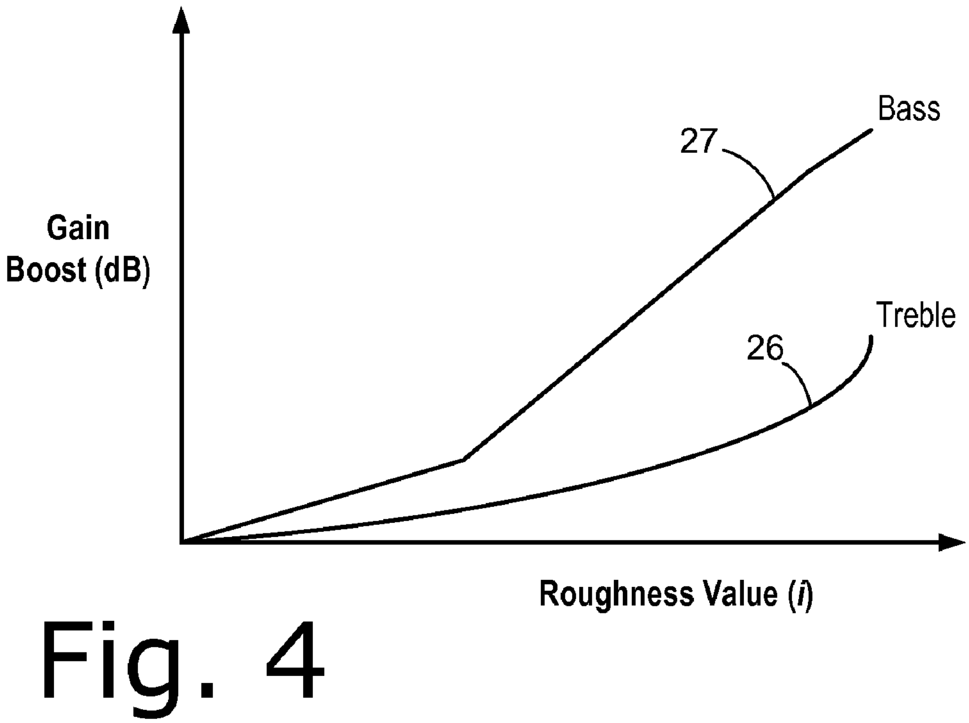
FIG. 4 shows transfer functions for an alternative embodiment for boosting bass gain and treble gain separately.

FIG. 4 shows an alternative embodiment wherein different audio frequency ranges are separately controlled in response to road roughness. The audio spectrum of noise created by a particular vehicle may vary significantly at different values of road roughness. Consequently, a more natural sound may be achieved by boosting different audio frequencies differently to compensate each frequency band equally over the road noise being produced in that frequency band. In particular, road noise generated and/or transmitted by the suspension system is enhanced in the bass portion of the audio spectrum. Therefore, a curve 26 generates a treble boost and a curve 27 generates a bass boost wherein the bass boost is larger over all values of roughness. Curve 27 also shows separate linear portions of the transfer function which can be more efficiently stored and generated in the transform block.

Figure 5:
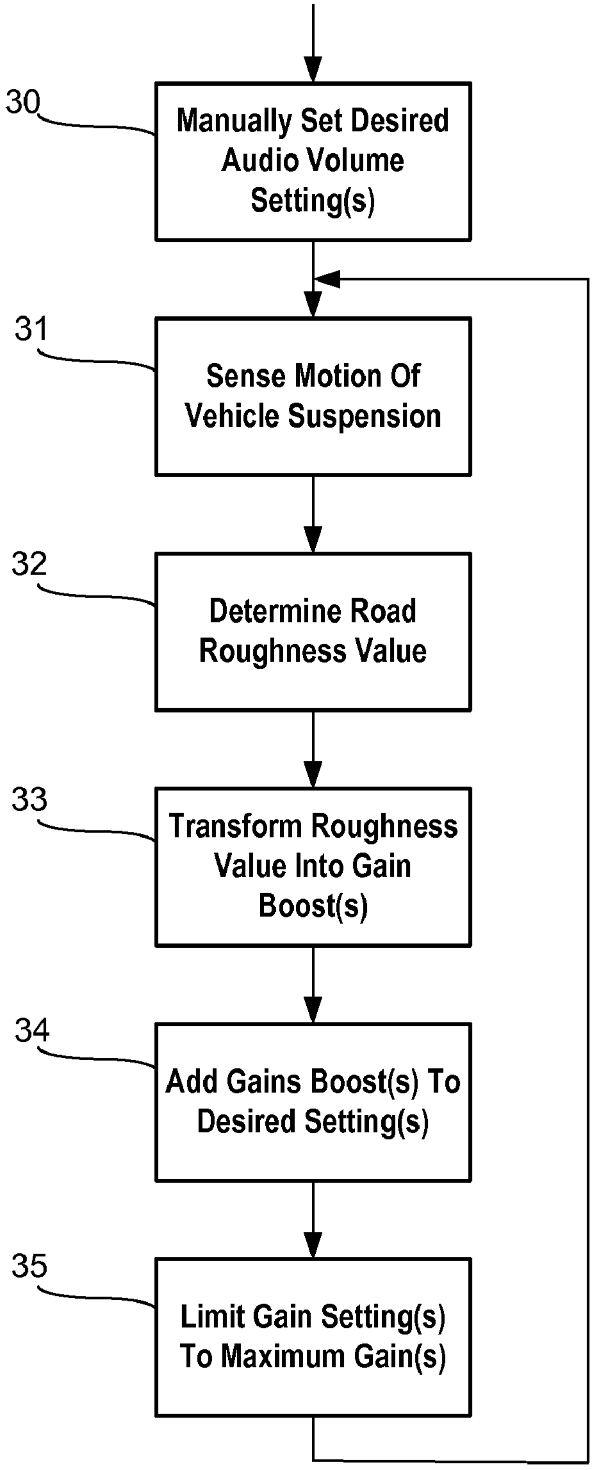
FIG. 5 is a flowchart of one preferred method of the invention.

A preferred method of the invention is shown in FIG. 5. Desired audio volume settings (e.g., and overall system volume and/or balance, fade, treble, and bass levels) are manually set by the user in step 30. During vehicle operation, motion of the vehicle suspension system is sensed in step 31. The suspension control system determines a roughness value in step 32. The roughness value is preferably transmitted to the multimedia audio system in a multiplex message. In step 33, the roughness value is transformed into a volume boost and/or corresponding gain boosts for separate frequency ranges and/or audio channels. The gain boosts are added to the desired (i.e., manual) settings in step 34. Before being applied to the power amplifier, the gain boosts are limited to a maximum gain in step 35. Then a return is made to step 31 for continuously updating the gain boosts as appropriate.

What is claimed is:

1. A method of controlling an audio gain of an audio system in a motor vehicle, the method comprising the steps of:

a vehicle occupant manually setting a desired audio volume level;

sensing motion of a suspension component within a suspension system of the vehicle during travel of the vehicle;

the suspension system transforming the sensed motion into a roughness value and controlling active damping within the suspension system according to the roughness value;

transmitting the roughness value from the suspension system to the audio system;

the audio system transforming the roughness value into a volume boost, the volume boost generally increasing with an increase in the roughness value; and adding the volume boost to the desired audio volume level to provide the audio gain.

2. The method of claim 1 further comprising the step of limiting a sum of the volume boost and the desired audio volume level to a predetermined maximum gain.

3. The method of claim 1 wherein the desired audio volume level includes relative gain settings for a plurality of audio frequency bands, and wherein the volume boost includes respective gain boosts for each of the audio frequency bands.

4. The method of claim 3 wherein the transforming step uses respective transfer functions for the audio frequency bands.

5. The method of claim 1 wherein the sensed motion is comprised of a vertical acceleration within the suspension system.

6. Apparatus for automatically controlling audio volume reproduced in a vehicle, comprising:

a suspension controller coupled to a suspension sensor mounted to a suspension component for characterizing a roughness value based on measurements of the suspension sensor, wherein the roughness value is used by the suspension controller to perform active damping of the suspension component;

an audio system including an audio processor, wherein the audio processor boosts the audio volume in response to the roughness value; and a communication bus coupled to the suspension controller and the audio system for transmitting the roughness value.

7. The apparatus of claim 6 wherein the audio system further includes a control element for manually setting a desired audio volume level, a transformer for transforming the roughness value into a volume boost, and a summer for adding the volume boost with the desired audio volume level to provide a gain level for the audio system.

8. The apparatus of claim 7 further comprising a limiter coupled to the summer for limiting the gain level to a predetermined maximum gain.

9. A method of controlling an audio gain of an audio system in a motor vehicle having an active suspension system, the method comprising the steps of:

driving the vehicle over a roadway;

characterizing roughness of the roadway within the active suspension system during the driving step to generate a roughness value used by the active suspension system to control active damping;

transmitting the roughness value to the audio system;

transforming the roughness value into a volume boost, the volume boost generally increasing with an increase in the roughness value; and adding the volume boost to a desired audio volume level that is set manually by a vehicle occupant to generate an audio gain for the audio system.

* * * * *